United States Patent [19]

Kondo

[11] Patent Number: 4,512,510
[45] Date of Patent: Apr. 23, 1985

[54] PRINTED CIRCUIT BOARD SOLDERING APPARATUS

[75] Inventor: Kenshi Kondo, Tokyo, Japan

[73] Assignee: Nihon Den-Nitsu Keiki Co. Ltd., Tokyo, Japan

[21] Appl. No.: 542,984

[22] Filed: Oct. 18, 1983

[30] Foreign Application Priority Data

Oct. 26, 1982 [JP] Japan .................. 57-186682
Oct. 26, 1982 [JP] Japan .................. 57-186681
Oct. 26, 1982 [JP] Japan .................. 57-186680

[51] Int. Cl.³ ............................. H05K 3/34
[52] U.S. Cl. ....................... 228/40; 228/43; 228/259; 228/180.1; 198/342; 118/423
[58] Field of Search ............ 228/36, 37, 38, 39, 228/40, 43, 179, 180 R, 185, 259, 260; 118/416, 421, 423, 425, 426; 198/342; 134/49, 83, 125, 165

[56] References Cited

U.S. PATENT DOCUMENTS

| 3,828,419 | 8/1974 | Wanner | 228/40 X |
| 4,090,654 | 5/1978 | Volkert | 228/40 |
| 4,284,225 | 8/1981 | Hess | 228/37 X |
| 4,285,457 | 8/1981 | Kondo | 228/40 X |
| 4,311,265 | 1/1982 | Kondo | 228/40 |
| 4,311,266 | 1/1982 | Kondo | 228/40 |

FOREIGN PATENT DOCUMENTS

| 57-28673 | 2/1982 | Japan | 228/259 |
| 423584 | 10/1974 | U.S.S.R. | 228/40 |

Primary Examiner—Kenneth J. Ramsey
Assistant Examiner—M. Jordan
Attorney, Agent, or Firm—Stephen F. K. Yee

[57] ABSTRACT

Carriers each carrying a printed circuit board is conveyed successively through a soldering zone to dip each printed circuit board in molten solder contained in a vessel disposed below a space defined by two pairs of parallel front and rear rails. The four rails are engageable with four wheels of the carrier simultaneously and are vertically moveable so the printed circuit board carried on the carrier on the rails are contacted with the molten solder when the rails are in their lowered positions. Engaging means is provided for movement with one of the rails and for supporting engagement with the carrier. The engaging means is horizontally moveable so that the carrier engaged by the engaging means is horizontally moved forward and backward. By suitably moving the rails and the engaging means, the printed circuit board may alight on and leave from the surface of the molten solder in any desired tilted state.

7 Claims, 25 Drawing Figures

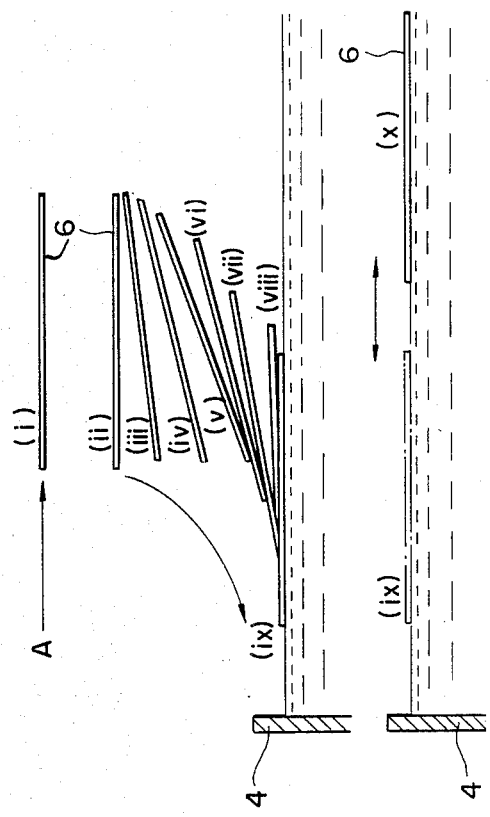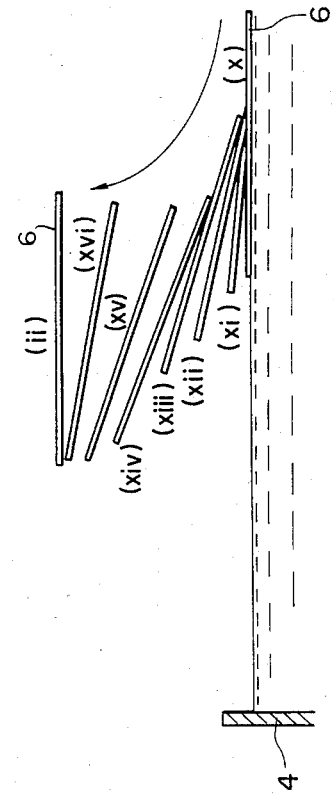
FIG. 7(a) FIG. 7(b) FIG. 7(c)

F I G. 12
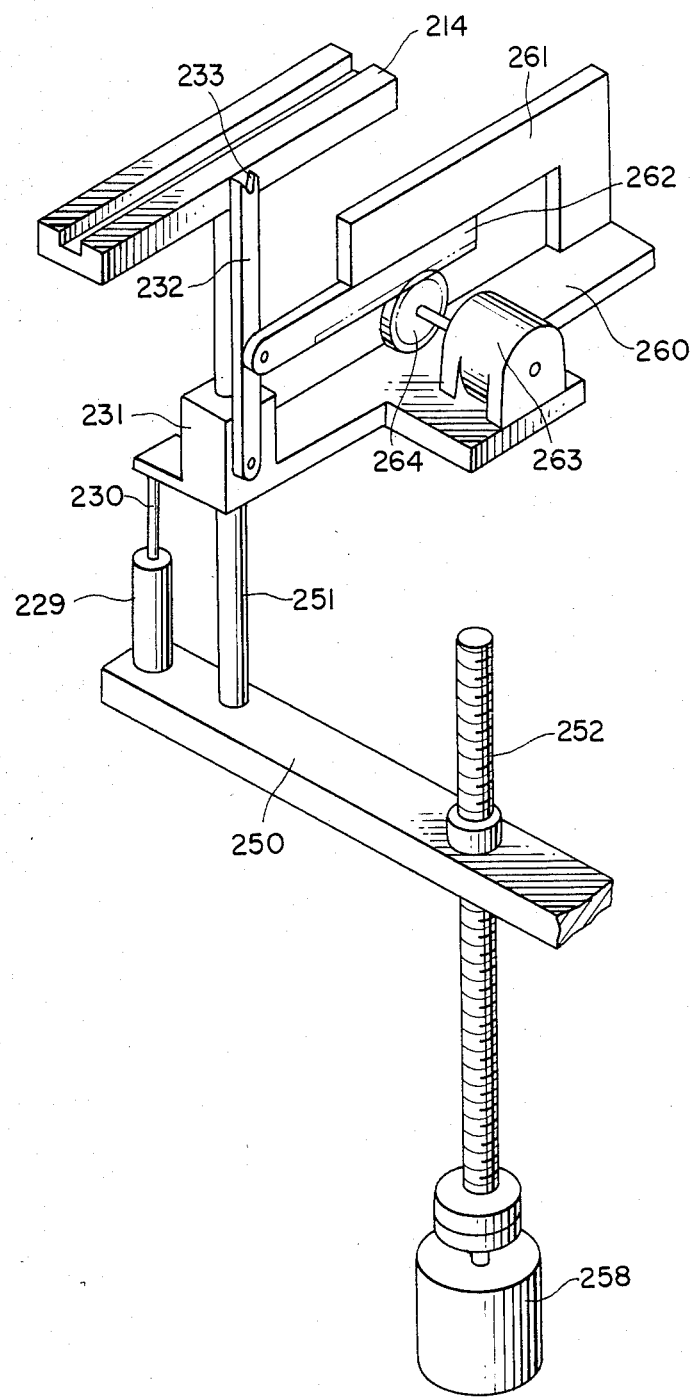

PRINTED CIRCUIT BOARD SOLDERING APPARATUS

BACKGROUND OF THE INVENTION

This invention relates generally to an automatic soldering apparatus and, more particularly, the present invention is concerned with an apparatus for uniformly applying molten solder to printed circuit boards carrying electrical parts thereon by dip soldering or touch soldering.

There have thus far been proposed various apparatuses of a conveyorized type for automatically soldering printed circuit boards by means of dip soldering. However, the conventional machines have a tendency to give rise to problems of soldering failures especially when applied to printed circuit boards whose underside surfaces have recessed or concaved portions. Such recesses can block the molten solder from flowing thereinto and can trap gases therein, causing incomplete deposition of the solder. The air bubbles which are once trapped in the recesses are difficult to remove even if the printed circuit board is contacted with molten solder for a long period of time.

SUMMARY OF THE INVENTION

With the foregoing situation in view, the present invention has as its prime object the provision of an automatic apparatus for uniformly applying molten solder to printed circuit boards.

It is a more specific object of the present invention to provide an improved type of automatic soldering apparatus which is capable of insuring reliable, uniform joints and which is free from the problem of gas trapping involved in the conventional machines.

In accordance with one aspect of the present invention, there is provided an improved apparatus for soldering printed circuit board, comprising:

a carrier adapted to support a printed circuit board;

means for moving the carrier along a predetermined transfer path;

first front and rear wheel members mounted at one side of the carrier;

second front and rear wheel members mounted at the other side of the carrier;

first and second vertically moveable supporting means;

a pair of transversely spaced parallel first and second front rails supported on said first supporting means for vertical movement therewith and defining part of said transfer path;

a pair of transversely spaced parallel first and second rear rails supported on said second supporting means for vertical movement therewith and defining part of said transfer path;

said first front and rear rails and said second front and rear rails being adapted for supporting engagement with said first front and rear wheel members and said second front and rear wheel members, respectively and being positioned so that said first front and rear wheel members and said second front and rear wheel members can be positioned on said first front and rear rails and said second front and rear rails, respectively, at the same time;

a molten solder vessel located beneath the space between said first and second front and rear rails;

first and second drive means for vertically moving said first and second supporting means; and engaging means operatively connected to one of said first and second supporting means for vertical movement therewith and capable of being displaced between a first position at which it may engage with the carrier for supporting same and a second position at which it may disengage from the carrier, said engaging means being moveable in a direction parallel with the direction of the transfer path of said carrier, whereby said first and second drive means are operated to move said first and second front and rear rails and to bring the printed circuit board carried on the carrier on the rails into contact with the molten solder, and said engaging means positioned in said first position operating to move the printed circuit board in the direction parallel with the transfer path of the carrier.

BRIEF DESCRIPTION OF THE DRAWNGS

Other objects, features and advantages of the present invention will become apparent from the detailed description of the preferred embodiments of the invention which follows, when considered in light of the accompanying drawings, in which.

Figure 8:
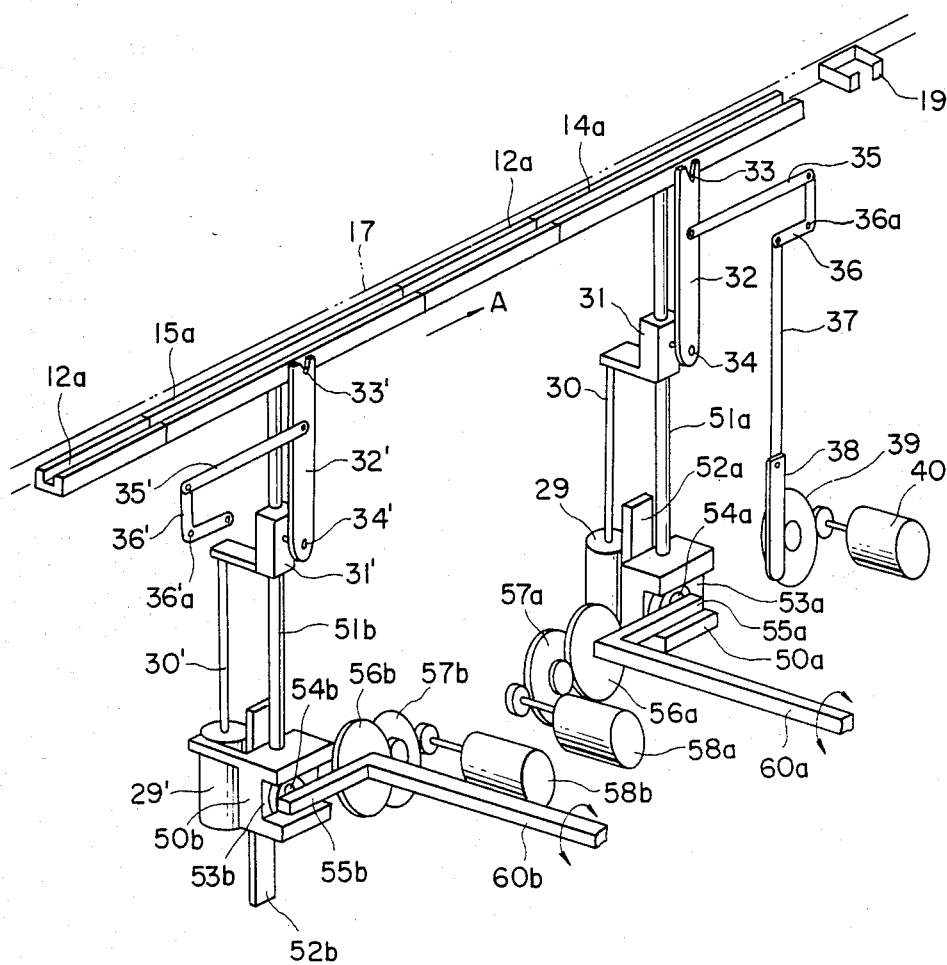
Figure 9A:
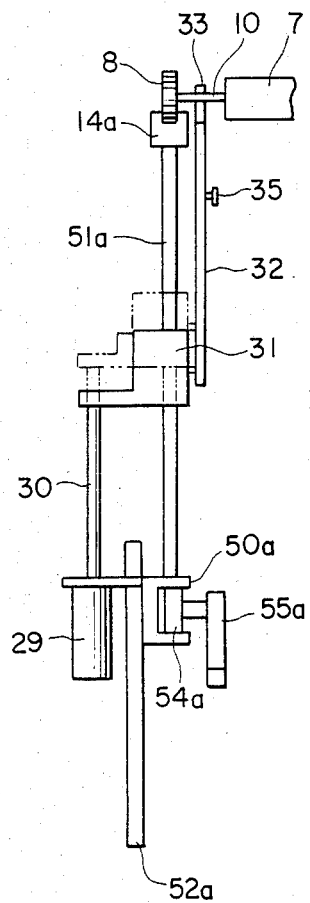
Figure 9B:
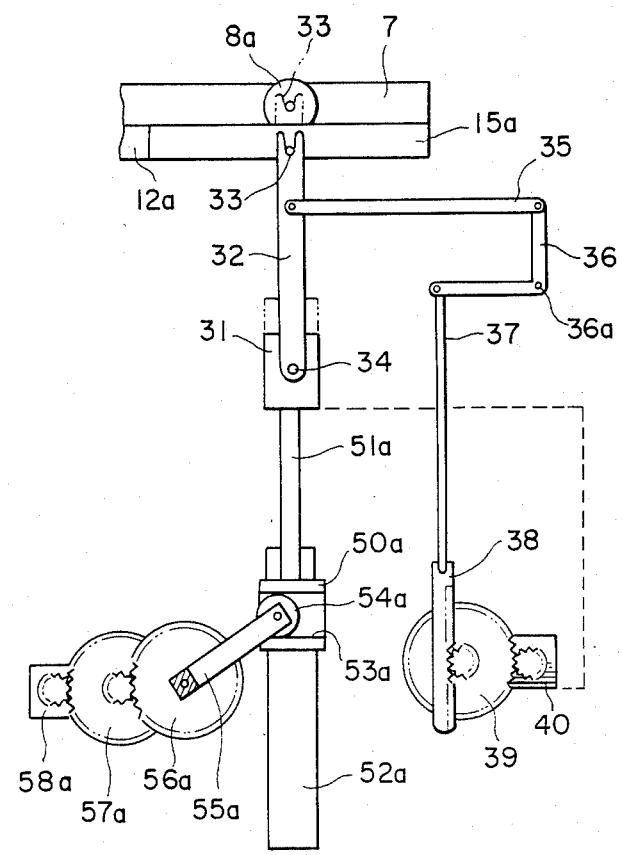
Figure 10A:
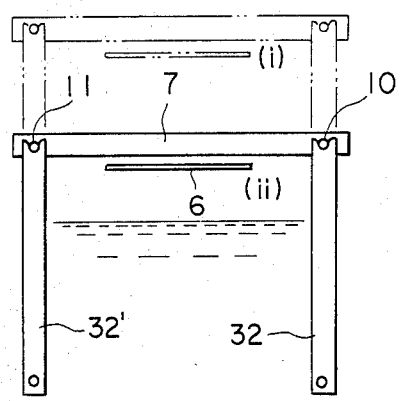
Figure 10B:
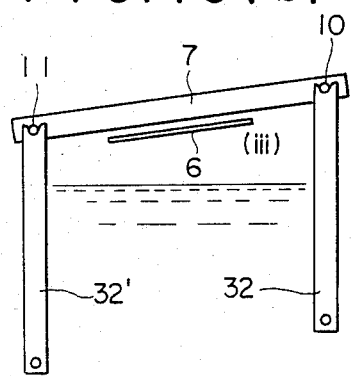
Figure 10C:
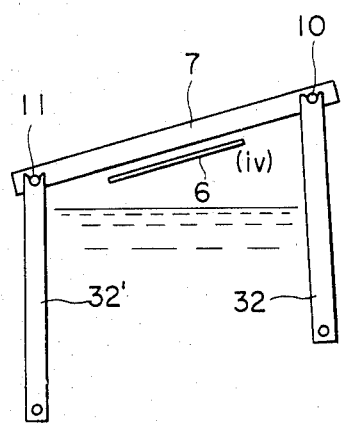
Figure 10D:
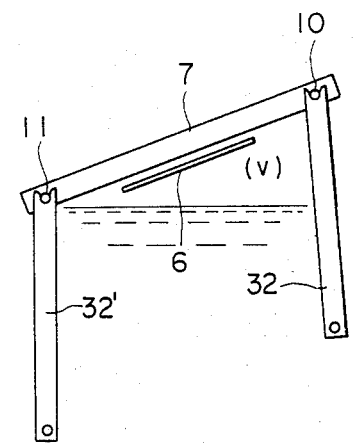
Figure 10E:
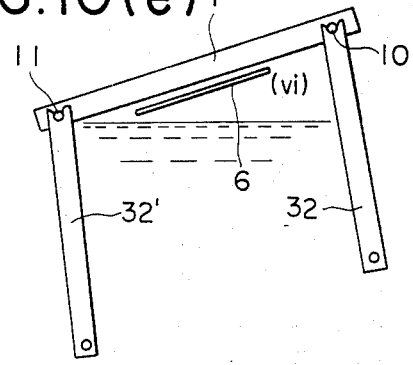
Figure 10F:
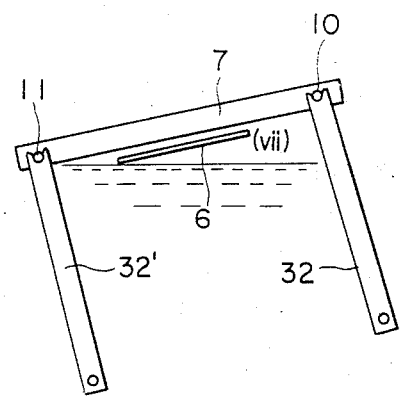
Figure 10G:
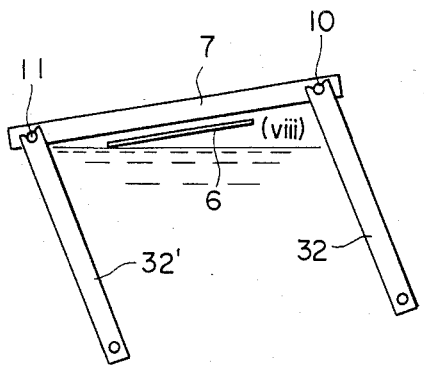
Figure 10H:
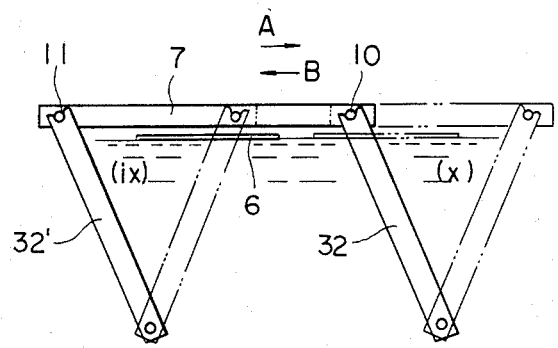
Figure 10I:
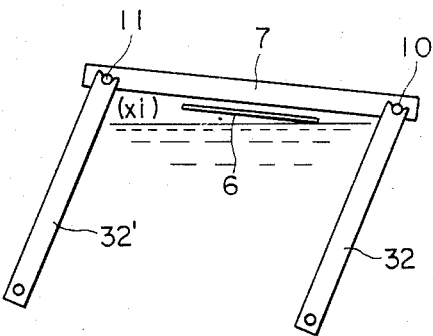
Figure 11:
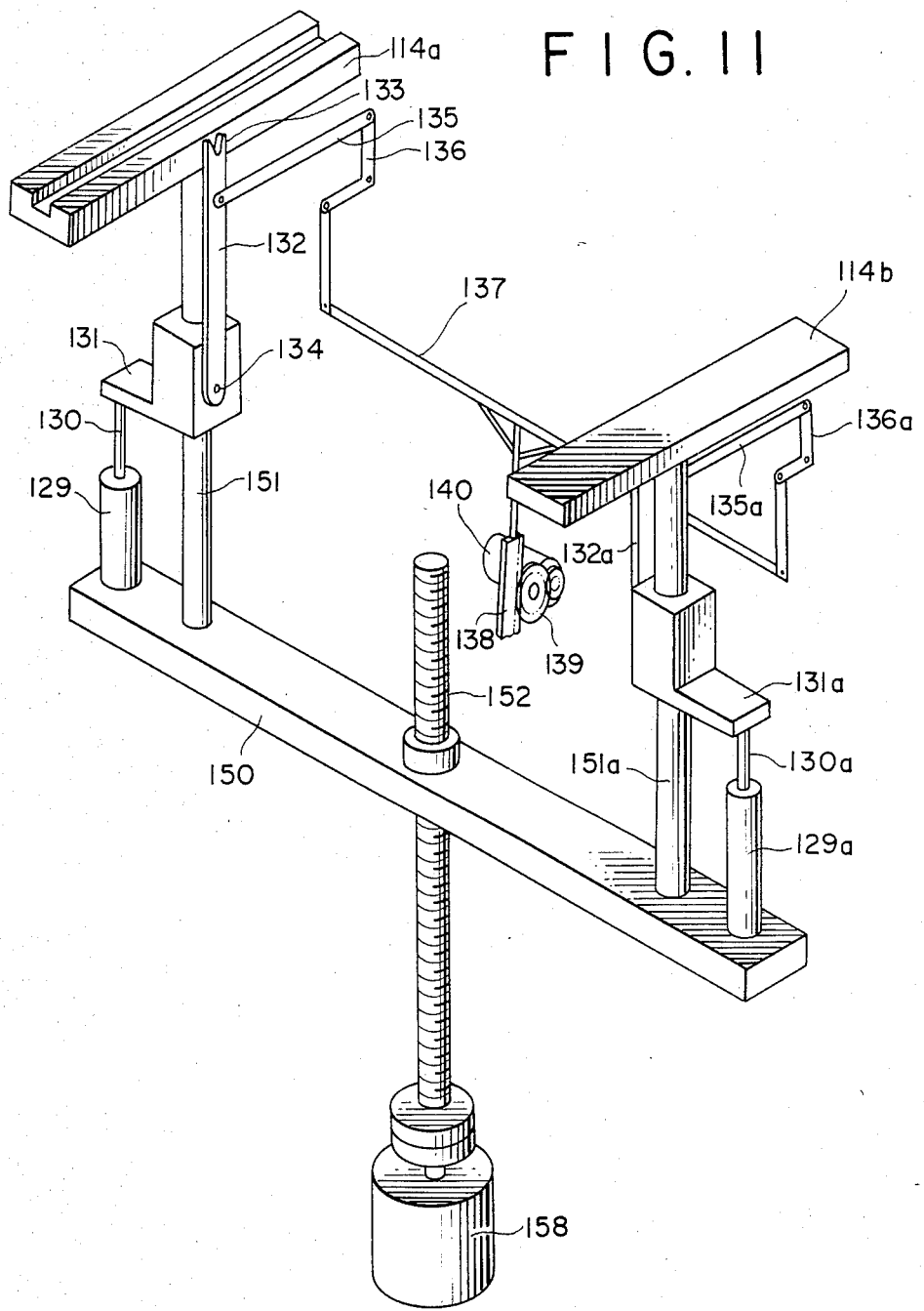
Figure 13:
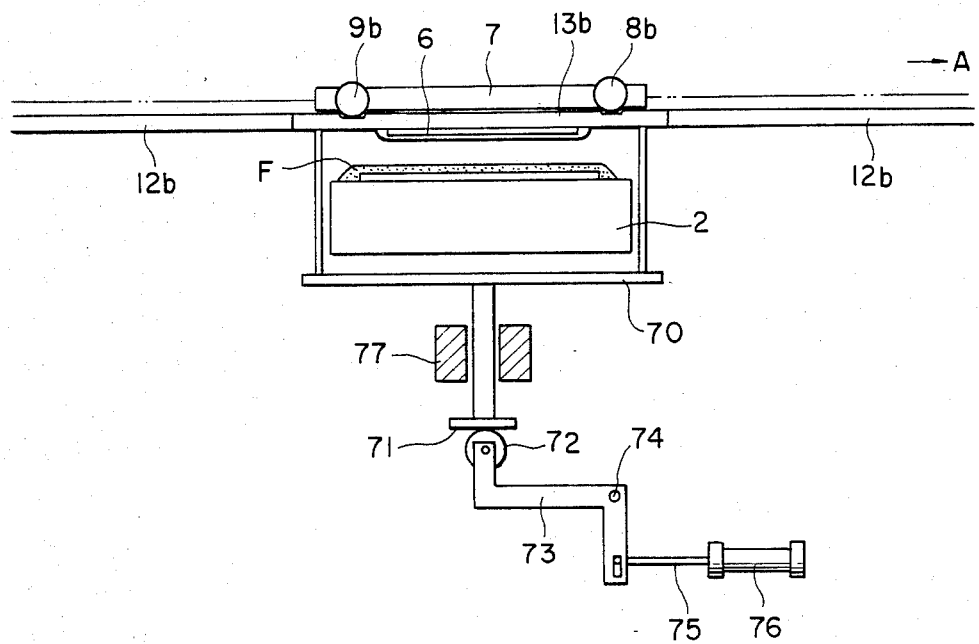
Figure 14:
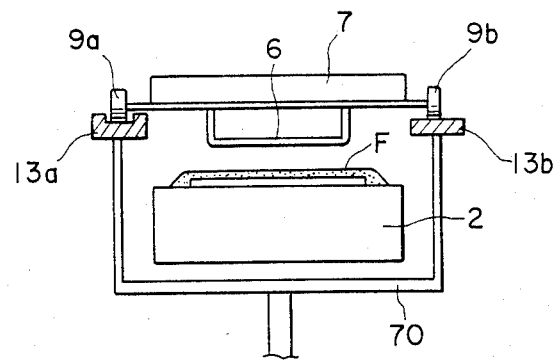

FIGS. 7(a) through 7(c) are explanatory views showing the movement of a printed circuit board during soldering operation;

FIG. 8 is a perspective view diagrammatically showing a mechanism for vertically and horizontally displacing the printed circuit board;

FIG. 9(a) is a fragmentary elevational view showing the operation of the displacing mechanism of FIG. 8;

FIG. 9(b) is a side view of FIG. 9(a);

FIG. 10(a) through FIG. 10(i) are explanatory views diagrammatically showing the movement of the printed circuit board by the displacing mechanism of FIG. 8;

FIG. 11 is a perspective view diagrammatically showing another embodiment of the displacing mechanism;

FIG. 12 is a perspective view similar to FIG. 11 diagrammatically showing a further embodiment of the displacing mechanism;

FIG. 13 is an elevational view diagrammatically showing a fluxer according to the present invention; and FIG. 14 is a side view of FIG. 13.

DESCRIPTION OF PREFERRED EMBODIMENTS

Figure 1:
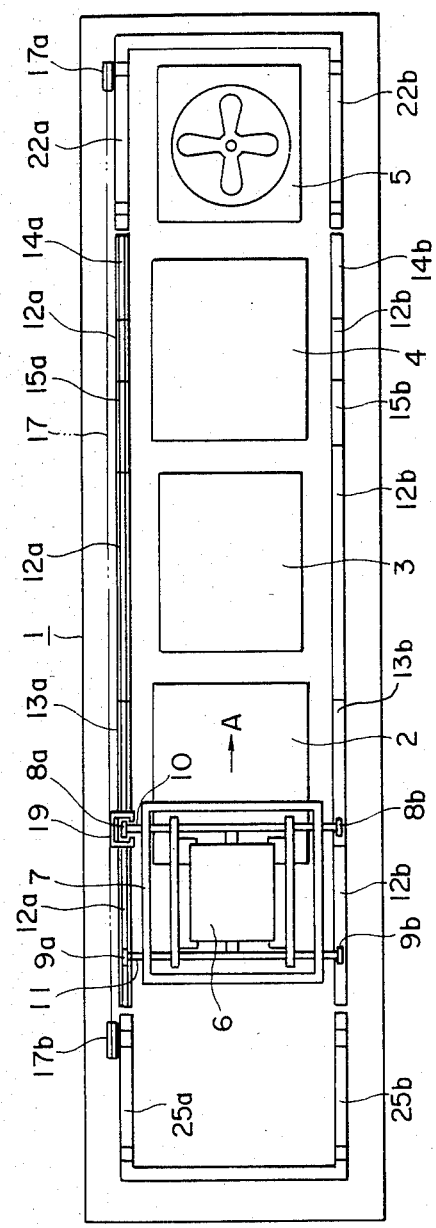
FIG. 1 is a plan view diagrammatically showing one embodiment of the soldering apparatus according to the invention.

Referring first to FIG. 1, denoted generally at 1 is a soldering apparatus according to the present invention. The soldering apparatus 1 includes a carrier 7 adapted for holding a printed circuit board 6 and being transferred along a predetermined path of travel in the direction shown by the arrow A. The carrier 7 is provided with first front and rear wheel members 8a and 9a at its one side and second front and rear wheel members 8b and 9b at its the other side. The front wheel members 8a and 8b and the rear wheel members 9a and 9b are rotatably supported on axles 10 and 11, respectively. The soldering apparatus is provided with a pair of parallel first and second transfer guide rails 12a and 12b defining the transfer path along which the carrier 7 travels. Thus, the first front and rear wheel members 8a and 9a engage with the the first guide rail 12a while the second front and rear wheel members 8b and 9b engage with the second guide rail 12b. Beneath the space defined between the transfer guide rails 12a and 12b are sequentially provided a fluxer 2, a preheater 3, a solder vessel 4, and a cooler 5.

Provided along the first transfer guide rail 12a is an endless conveyor chain 17 for transferring the carrier 7 along the transfer path. The conveyor chain 17 is placed around a pair of spacedly positioned drive and idler sprocket wheels 17a and 17b provided on the apparatus frame. The drive sprocket wheel 17a is driven to turn the conveyor chain 17 around the sprockets 17a and 17b in a controlled manner. The conveyor chain 17 is provided with one or more connecting members 19 adapted for linking the carrier 7 with the conveyor chain 17 for displacing the carrier 7 with the conveyor chain 17.

Figure 3:
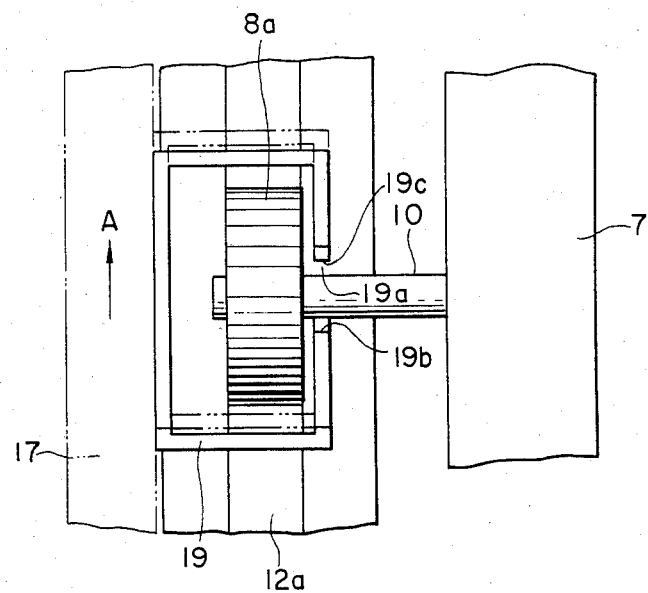
FIG. 3 is a fragmentary, enlarged plan view diagrammatically showing a mechanism for transferring a carrier on guide rails.
Figure 4:
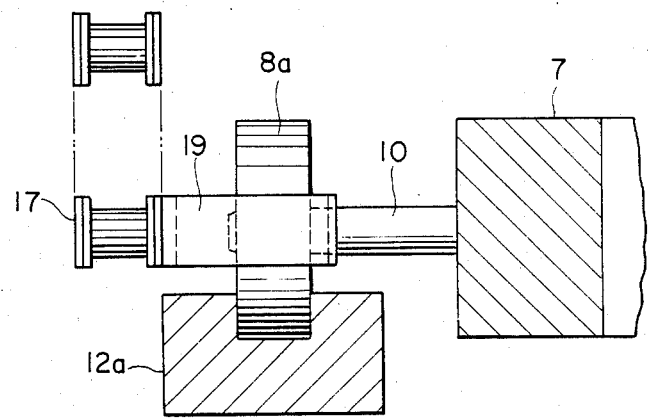
FIG. 4 is a side view of FIG. 3.

Referring to FIGS. 3 and 4 which illustrate a preferred embodiment of the connecting member 19, the connecting member 19 in this embodiment is a C-shaped frame oriented outwardly for enclosing therein the first front wheel member 8a rotatably supported about the axle 10 of the carrier 7. The C-shaped frame 19 has an apperture 19a formed between front and rear edges 19c and 19b for the passage of the axle 10 therethrough. Thus, when the C-shaped frame 19 is displaced in the direction of the arrow A, by the actuation of the transfer chain 17, the rear edge 19b of the frame 19 is brought into abutting engagement with the axle 10 to move the carrier 7. When the transfer chain 17 stops running, the carrier 7 still moves by inertia and stops when the axle 10 engages the front edge 19c of the C-shaped frame. It is seen from FIGS. 3 and 4 that by lowering the guide rail 12a the carrier 7 disengages with the C-shaped frame 19.

Referring again to FIG. 1, the carrier 7 loaded with the printed circuit board 6 moves along the guide rails 12a and 12b with its axle 10 engaged with the connecting member 19 and successively travels through the fluxer 2, preheater 3, solder vessel 4 and cooler 5 to complete the soldering operation.

Figure 2:
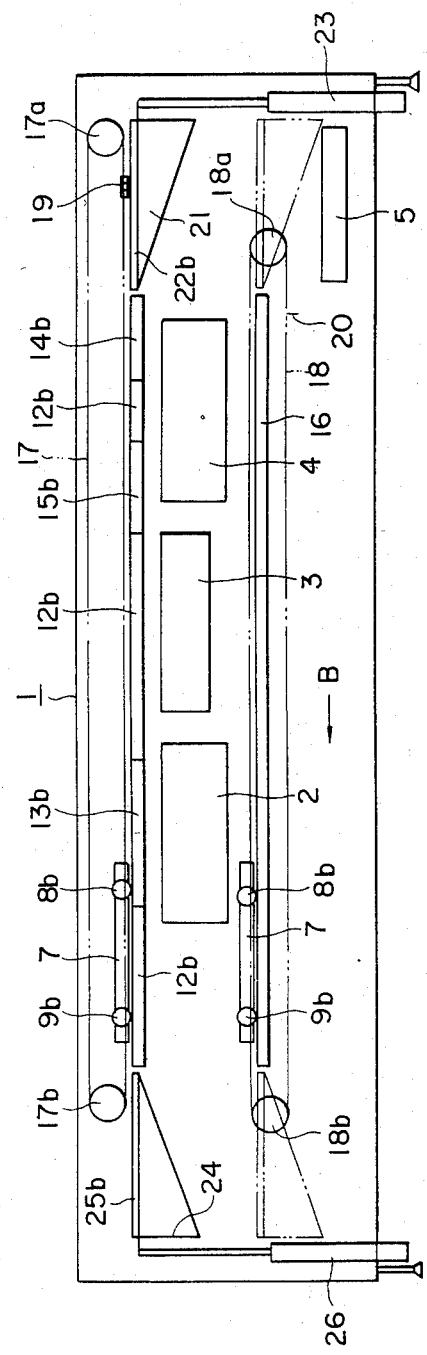
FIG. 2 is an elevational view of FIG. 1.

As shown in FIG. 2, there is provided a lower, return transfer path below the above-mentioned upper transfer path. The lower transfer path is also defined by a pair of parallel guide rails 16 and 16 adapted for supporting engagement with the wheels 8a, 8b, 9a and 9b of the carrier 7. A return endless transfer chain 18 is provided adjacent the rail 16 and around a pair of drive and idler sprocket wheels 18a and 18b. The chain 18 is provided with one or more connecting members, such as L-shaped pins 20, for engagement with the axle 11 of the carrier 7 and for driving the carrier 7 therewith.

Figure 5:
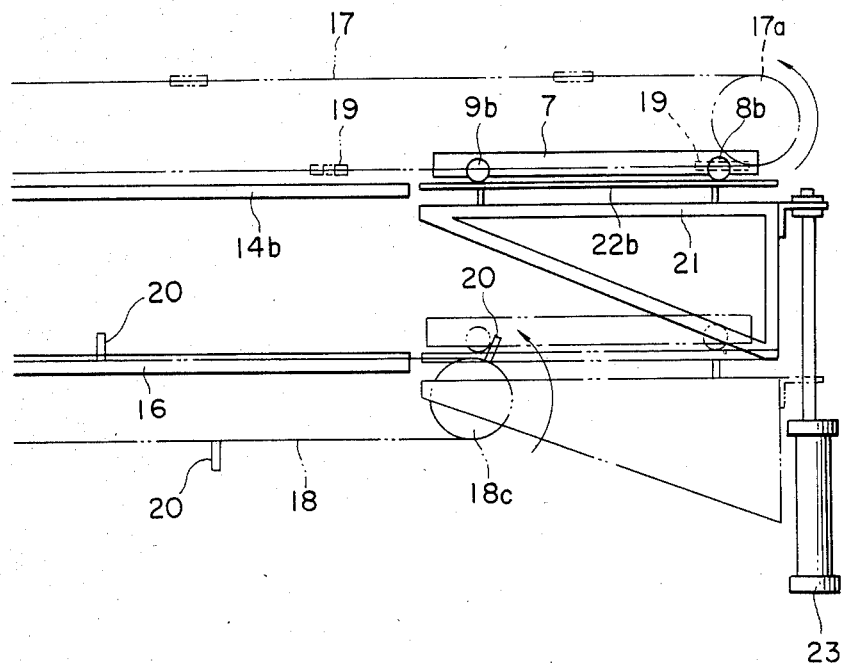
FIG. 5 and FIG. 6 are fragmentary, enlarged elevational views diagrammatically showing carrier-lowering and carrier-lifting mechanisms, respectively.

As shown in FIG. 5, the terminal portion of the upper transfer path is defined by a pair of rails 22a and 22b supported on a vertically moveable base 21. Designated as 23 is a driving means such as an air cylinder for displacing the base 21 up and down. When the carrier 7 is located at a predetermined position on the rails 22a and 22b, the transfer chain 17 pauses and the air cylinder 23 is actuated for lowering the rails 22a and 22b with the carrier 7 being placed thereon. When the air cylinder 23 is in its retracted position, the rails 22a and 22b can locate at a position so that they can define a part of the lower transfer path. Thus, the pin 20 of the transfer chain 18 is brought into contact with the wheel axle 11 to displace the carrier along the return transfer path in the direction of the arrow B (FIG. 2). During the location of the carrier 7 on the rails 22a and 22b, the printed circuit board which has been applied with the molten solder is cooled by the cooler 5.

Figure 6:
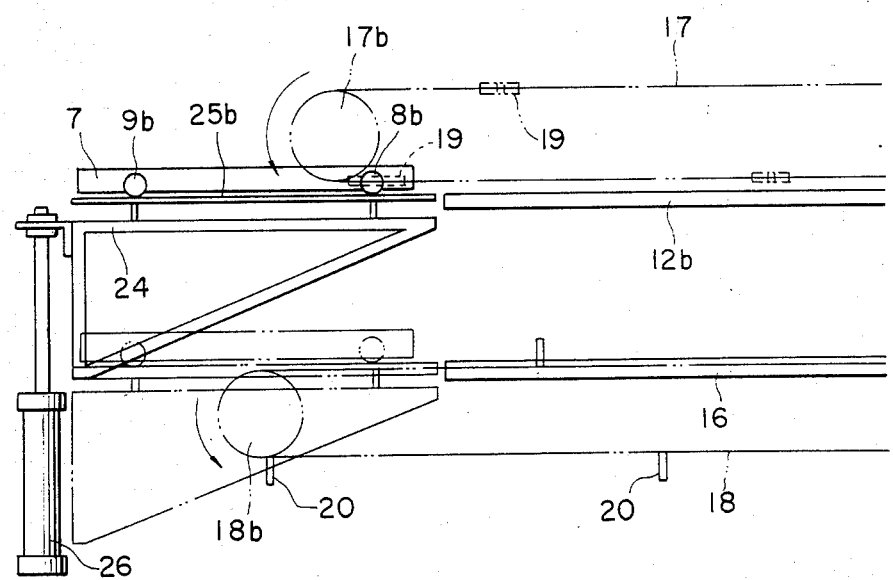

A similar carrier lifting arrangement is provided at the terminal portion of the return transfer path. As shown in FIG. 6, a pair of rails 25a and 25b are supported on a vertically moveable base 24 connected to an air cylinder 26. The rails 25a and 25b define a part of the lower transfer path when the air cylinder 26 is in its retracted state and a part of the upper transfer path when the air cylinder is in its extended state.

When the carrier 7 is carried along the return transfer path and is located at a predetermined position on the rails 25a and 25b, the sprockets 17b and 18b stop rotating to position the connecting member 19 at a predetermined location. Then the air cylinder 26 is actuated to lift the rails 25a and 25b supporting thereon the carrier 7. The connecting member 19 receives the front wheel 8a when the rails 25a and 25b are positioned in alignment with the rails 12a and 12b. Then the transfer chain resumes operation to carry the carrier again through the respective treating zones. In the lower position, the printed circuit board which has undergone the soldering treatment is removed from the carrier by any suitable means (not shown) and the unloaded carrier is loaded with a next printed circuit board to be treated at the upper position by means of any suitable loading mechanism (not shown).

The prominent aspect of the present invention is a mechanism for contacting the printed circuit board 6 carried on the carrier 7 with molten solder contained in the solder vessel 4. FIGS. 7(a) through 7(c) illustrate the sequence of the preferred movement of the printed circuit board 6 relative to the surface of the molten solder in the vessel 4 for dip soldering with the use of the apparatus of the present invention. The board 6 horizontally transferred in the direction shown by the arrow A is stopped above the vessel 4 in a horizontal position (i). Then, the board 6 is vertically lowered to a position (ii). Next, the rear end of the board 6 is lowered at a higher speed than the front end is. In addition, the board 6 is moved horizontally in the rearward direction (titled positions (iii) through (v)). The lowering speed of the rear end is then gradually reduced (positions (v) and (vi)) and the lowering motion is stopped when it is brought into contact with the molten solder (position (vii)). The fore end still moves downward until it contact with the molten solder (position (vii) through (ix)). Throughout the vertical downward movement of the board 6 from the position (ii) to (ix), it is continuously moved horizontally and rearwardly. When the entire underside surface of the board 6 is dipped in the molten solder (position (ix)), the board 6 is moved foreward (position (x)). If desired, the board is horizontally reciprocally moved between the positions (ix) and (x) one or more times as shown in FIG. 7(b).

FIG. 7(c) shows the lifting manner of the board 6. The rear end is first moved upward (position (xi)) and the fore end is more slowly lifted than the rear end. In this case, too, the board 6 is continuously moved horizontally in the backward direction. Then the fore end leaves the surface of the molten solder (position (xiii))

and the board 6 returns to the previous position (ii). The thus treated board is then lifted to the start position (i) for movement to the succeeding cooling zone.

FIG. 8 shows the essential part of one embodiment for carrying out the above-mentioned movement of the printed circuit board 6 to effect the dip soldering. The first and second transfer guide rails 12a and 12b are disconnected at the soldering vessel 4 and instead provided with first and second front rails 14a and 14b and first and second rear rails 15a and 15b, respectively (FIGS. 1 and 2). These four rails 14a, 14b, 15a and 15b are arranged so that the four wheels 8a, 8b, 9a and 9b can be positioned simultaneously thereon, respectively. To simplify the explanation, there is shown in FIG. 8 only the first front and rear rails 14a and 15a and their associated constructions. The second front and rear rails 14b and 15b are constructed so that the second front and rear rails 14b and 15b can move in the same manner as the first front and rear rails 14a and 15a, respectively.

The first front and rear rails 14a and 15a are supported on vertically moveable first and second supporting means 50a and 50b, respectively, by means of first and second rods 51a and 51b. The first and second supporting means 50a and 50b are slidably supported respectively by vertical guide bars 52a and 52b which are firmly fixed on a base frame (not shown). Means are provided for moving each supporting means 50a and 50b along respective guide bars 52a and 52b. Thus, the supporting means 50a and 50b have grooves 53a and 53b, respectively, within which rollers 54a and 54b rotatably supported at respective end portions of cranks 55a and 55b, are in rolling contact. The other ends of the cranks 55a and 55b are fixedly connected to driven gears 56a and 56b, respectively, which are rotatably supported on respective stationary shaft (not shown). In meshing engagement with the driven gears 56a and 56b are drive gears 57a and 57b, respectively, which are driven by drive motors 58a and 58b, respectively.

As a result of the above construction, when the motor 58a is actuated to rotate the drive gear 57a, the driven gear 56a will rotate about its shaft so that the crank 55a fixedly connected to the gear 56a will rotate therewith. Therefore, the first supporting means 50a will slide downward or upward together with the front rail 14a according to the direction of the rotation of the crank 55a, i.e. motor 58a. Similarly, the first rear rail 15a supported on the support means 50b is displaced upward or downward by driving the motor 58b.

In one embodiment, the second front and rear rails 14b and 15b are vertically moved together with the first front and rear rails 14a and 15a, respectively. This can be achieved by, for example, providing the second front and rear rails 14b and 15b with supporting and moving mechanisms similar to the above. In this case, by operatively connecting respective cranks by means of a transmission shaft 60a as shown in FIG. 8, the front rails 14a and 14b can be simultaneously dispalced. Also the rear rails 15a and 15b can be simultaneously displaced by rotation of the motor 52b by connecting their cranks by a transmission shaft 60b. Alternatively, the first and second rails 14a and 14b, for example, can be supported on a common supporting means. The movement of the common supporting means can simultaneously displace the rails 14a 14b.

Thus, by operating the motors 58a and 58b under a predetermined, programmed control, the printed circuit board 6 carried on the carrier 7 on the rails 14a, 14b, 15a and 15b is vertically displaced with any desired tilted position. In order to prevent the spontaneous movement of the carrier when tilted and to move the carrier in the direction parallel with the transfer path of the carrier during its disengagement from the connecting member 19, there is further provided carrier engaging means as described below.

With continued reference to FIG. 8, a slider 31 is slidably supported by the rod 51a which connects the first front rail 14a with the first supporting means 50a. To the slider 31 is pivoted one end of a lever arm 32 by a pivot 34. The other end of the lever arm 32 is formed with a U-shaped groove 33 for receiving therein a suitable portion of the carrier, such as the wheel axle 10. An air cylinder 29 is mounted on the first supporting means 50a, whose operating rod 30 is connected to the slider 31. Thus, when the air cylinder 29 is actuated to extend the rod 30, the slider 31 is moved upward with the rod 51a serving as a guide so that the groove 33 of the lever arm 32 is extended to a service position for receiving the wheel axle 10 of the carrier. When the groove 33 is in a retracted position, the wheel axle 10 is disengaged therefrom.

Pivoted by means of a pivot 36a on a suitable position (not shown) of the first supporting means 50a is an L-shaped link 36. One end of the L-shaped link 36 is rotatably connected to one end of an arm 35 with the other end being rotatably connected to an end of a connector 37 which in turn is rotatably connected to a rack 38 slidably supported on a suitable portion (not shown) of the supporting means 50a. The other end of the arm 35 is rotatably connected to a middle portion of the lever arm 32. In meshing engagement with the rack 38 is a drive gear 39 which is driven by a motor 40 mounted on a suitable portion (not shown) of the supporting means 50a.

As a consequence of the foregoing arrangement, the actuation of the motor 40 can rotate the gear 39 to vertically displace the rack 38 together with the connector 37. This causes the rotation of the L-shaped link 36 about its pivot 36a, thereby rotating the lever arm 32 about the pivot 34.

It is preferred that a similar mechanism for laterally displacing the carrier 7 be provided on opposite side, i.e. adjacent the second front rail 14b. In this case, it is possible to use the air cylinder 29 and/or the motor 40 also for the movement of the lever arm which is associated with the wheel axle 10 of the second front wheel 8b by providing suitable transmission member similar to the shaft 60a. It is also preferred that the engaging means be provided for supporting the rear portion of the carrier 7 as shown in FIG. 8. In FIG. 8, components 29'–36' and 36a' constituting the engaging means for the rear portion of the carrier 7 correspond to the components 29–36 and 36a, respectively. Since in the state where the lever arms 32 and 32' are positioned to engage with the wheel axles 10 and 11, respectively, the movement of the lever arm 32 can simultaneously move the lever arm 32' therewith, it is not necessary to provide a mechanism, such as the arrangement corresponding to the components 37–40, for rotating the lever arm 32'.

The operation of the above-described carrier-displacing mechanism will be described below with reference to FIGS. 3, 7(a)–7(c), 8, 9 and 10(a)–10(i). The positions (i) through (xi) of the printed circuit board 6 in FIGS. 7(a)–7(c) correspond to those in FIGS. 10(a)–10(i), respectively. The drive sprocket 17a is stopped when the carrier 7 reaches a predetermined position over the solder vessel 4 with its four wheels 8a, 8b, 9a and 9b being supported by the rails 14a, 14b, 15a and 15b, respectively. In this case, the printed circuit board 6 mounted on the carrier 7 has the position shown at (i) of FIGS. 7(a) and 10(a). Then, the air cylinders 29 and 29' are actuated to lift the lever arms 32 and 32' each in an extended state where the U-shaped grooves 33 and 33' engage with the wheel axles 10 and 11, respectively.

The motors 58a and 58b are then actuated to lower the rails 14a, 14b, 15a and 15b by the same distance with the axles 10 and 11 being maintained in supported engagement with the grooves 33 and 33'. The vertical downward movement of the carrier 7 causes the disengagement thereof from the connecting member 19. Thus, the printed circuit board 6 is shifted to the position (ii). The motors 58a and 58b are then operated in a differently controlled manner to tilt the printed circuit board 6. At the same time, the motor 40 begins to rotate to displace the board 6 in the direction opposite to the transfer direction A (positions (iii)–(vi)).

The motor 58b stops when the rails 15a and 15b are lowered to the extent that the rear end of the board 6 is brought into contact with the solder in the vessel 4 (position (vii)). In this case, the motors 58a and 40 still continue to operate. The motor 58a stops when the rails 14a and 14b are lowered such that the fore end of the board 6 contacts with the solder, i.e. the entire underside surface of the printed circuit board 6 is dipped in the solder in the vessel 4 (position (ix)). Then the motor 40 rotates in the reverse direction to move the printed circuit board 6 in the direction A (position (x)). If desired, the motor 40 is operated repeatedly in the opposite directions to reciprocally move the board twice or any desired number of times. In this case, since the locus of each of the grooves 33 and 33' is not straight but arched, the printed circuit board 6 will slightly move up and down relative to the surface of the solder. However, such a movement can be neglected and does not adversely affect the soldering operation if the lever arms 33 and 33' are sufficiently long. Moreover, such a vertical movement does not occur when the grooves 33 and 33' have a sufficient depth.

Then the motor 58b is operated in the reverse direction to lift the rear end of the board 6 while operating the motor 40 to move the board 6 in the backward direction (position (xi)). Thereafter, the motor 58a starts operation to lift the fore end of the board 6 (positions (xii)–(xvi) of FIG. 7(c)). The motor 40 stops when the board 6 returns to the position (ii) and the motors 58a and 58b operate to lift the board 6 to the initial position (i) where the rails 14a, 14b, 15a and 15b align with the transfer rails 12a and 12b and the carrier 7 is again engaged by the connecting member 19. The air cylinders 29 and 29' are actuated to lower the lever arms 32 and 32' to their retracted positions and the drive sprocket 17a starts operation to transfer the carrier 7 carrying the printed circuit board applied with solder treatments to the succeeding cooling zone.

With the above-described apparatus according to the present invention, the locus of the displacement of the printed circuit board is arched and the board alights on and leaves from the surface of the molten solder in the tilted state, thereby the air trapping and the deposition of an unnecessary amount of the molten solder are prevented. Further, the displacing velocity, contact time with the molten solder and angular orientation of the board can be controlled at will by controlling the rotation of the motors 58a, 58b and 40.

FIG. 11 shows an alternate embodiment of the carrier displacing mechanism of the present invention, in which corresponding parts have been designated by the same reference numerals as part of a "100" series and in which the base frame, guide or other elements are omitted from the illustration. A pair of front rails 114a and 114b are supported on a vertically moveable supporting means 150 by means of rods 151 and 151a, respectively. The supporting means 150 is provided with internally threaded bores for meshing engagement with a vertical feed screw 152 which is connected to the shaft of a motor 158. Thus, when the feed screw 152 is driven from the motor 158, the rails 114a and 114b are simultaneously moved therewith upward or downward according to the forward or rearward rotation of the motor 158.

Fixed on the supporting means 150 are air cylinders 129 and 129a having their operating rods 130 and 130a connected to sliders 131 and 131a which are slidably supported by the rods 151 and 151a, respectively. Lever arms 132 and 132a are pivotally supported on the sliders 131 and 131a, respectively at their end portions. The middle portions of the lever arms 132 and 132a are pivotally connected to arms 135 and 135a, respectively which are swingably connected to L-shaped links 136 and 136a, respectively. The links 136 and 136a are interconnected by a transmission rod 137 which in turn is connected to a combination of a rack 138, a drive gear 139 and a motor 140.

Thus, by rotation of the motor 140, lever arms 132 and 132a are simultaneously rotated. A similar rail moving and carrier engaging arrangement is provided in the rear rails for performing the soldering operation as shown in FIG. 7.

FIG. 12 shows a further embodiment of the carrier displacing mechanism of the present invention. A rail 214 is supported by means of a rod 251 on a vertically moveable supporting means 250 which is meshing engagement with vertical feed screw 252 connected to a motor 258. The rotation of the motor 258 can vertically displace the rail 214. An air cylinder 229 is fixed on the supporting means 250 and the end of its operating rod 230 is connected to a slider 231 slidably supported by the rod 251. A rack 262 is slidably received in a guide 261 provided on a support member 260 which is integrally mounted on the slider 231. The rack 262 is meshed with a drive gear 264 driven by a motor 263 fixed on the support member 260. A lever arm 232 is pivoted to the rack 262. One end of the lever arm 232 is pivotally connected on the slider 231 while the other end is formed with a U-shaped groove 233 adapted for receiving a suitable portion of the carrier (not shown). Although not shown, there is provided similar rail displacing and supporting mechanism in association with the other pair of the rear rails.

The air cylinder 229 is actuated when the carrier 7 is stopped at a predetermined position above the soldering vessel so that the U-shaped groove 233 comes into engagement with a suitable portion of the carrier, such as an axle of its wheels. Then, the motor 258 is rotated to lower the rail 214 supporting thereon the carrier 7 and the motor 263 is rotated to shift the carrier in the horizontal direction, whereby the printed circuit board can undergo the soldering treatment as described previously with reference to FIG. 7.

FIGS. 13 and 14 show a preferred embodiment of the fluxer. The first and second guide rails 12a and 12b are disconnected at the fluxer zone 2 and instead provided with the first and second fluxer rails 13a and 13b. The rails 13a and 13b are supported on a vertically moveable support plate 70. The support plate 70 has a surface 71 adapted to engage with a roller 72 rotatably supported on an end portion of an L-shaped lever 73. The lever 73 is pivoted on a base frame (not shown) by means of a pivot 74 and has the other end portion rotatably connected to an operating rod 75 of an air cylinder 76 fixedly secured on the base frame. Indicated as 77 is a guide for the moveable support plate 70.

The above-described fluxer device operates as follows. The carrier 7 having mounted thereon a printed circuit board 6 and travelling along the guide rails 12a and 12b stops at a predetermined position of the fluxer rails 13a and 13b. Then the air cylinder 76 is actuated to retract the operating bar 75. This causes rotation of the lever 73 about the pivot 74. Thus, the moveable support plate 70 which is in supporting engagement with the roller 72 of the lever 73 is lowered while being guided by the guide 77. Therefore, the carrier 7 is disengaged from the connecting member 19 and lowered so that the printed circuit board 6 touches with the flux F of the fluxer 2. The air cylinder 76 is then operated to extend its operating bar 75 whereby the rails 13a and 13b are returned to their previous positions in alignment with the transfer rails 12a and 12b, respectively. The carrier 7 again engages with the connecting member 19 and moves towards the succeeding preheat zone 3.

The invention may be embodied in other specific forms without departing from the spirit or essential characteristics thereof. The present embodiments are therefore to be concidered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. An apparatus for soldering printed circuit board, comprising:
   a carrier adapted to support a printed circuit board;
   means for moving the carrier along a predetermined transfer path;
   first front and rear wheel members mounted at one side of the carrier;
   second front and rear wheel members mounted at the other side of the carrier;
   first and second vertically moveable supporting means;
   a pair of transversely spaced parallel first and second front rails supported on said first supporting means for vertical movement therewith and defining part of said transfer path;
   a pair of transversely spaced parallel first and second rear rails supported on said second supporting means for vertical movement therewith and defining part of said transfer path;
   said first front and rear rails and said second front and rear rails being adapted for supporting engagement with said first front and rear wheel members and said second front and rear wheel members, respectively, and being positioned so that said first front and rear wheel members and said second front and rear wheel members can be positioned on said first front and rear rails and said second front and rear rails, respectively, at the same time;
   a molten solder vessel located beneath the space between said first and second front and rear rails;
   first and second drive means for vertically moving said first and second supporting means so that said front and rear rails may be vertically moved independently from each other;
   engaging means for laterally displacing the carrier in the direction parallel with the direction of the transfer path of the carrier, said engaging means being operatively connected to one of said first and second supporting means for vertical movement therewith and capable of being displaced between a first position at which it may engage with the carrier for supporting same and a second position at which it may disengage from the carrier; and
   an engaging means-displacing means for laterally displacing the said engaging means in the direction parallel with the direction of the transfer path of the carrier,
   whereby said first and second front and rear rails lower upon actuation of said first and second drive means to bring the printed circuit board carried on the carrier on said rails into contact with the molten solder, and said engaging means positioned at said first position being displaced to move the printed circuit board in the direction parallel with the transfer path of the carrier.

2. An apparatus as set forth in claim 1, wherein said engaging means includes:
   a rod extending between the associated rail and its supporting means;
   a slider slidably supported by said rod;
   a lever arm having one end formed with a groove and the other end pivoted on said slider, said groove being adapted to receive therein a portion of the carrier so that the carrier engaged by said groove of said lever arm may move together with said groove; and
   means connected to said slider for moving said slider along said rod so that said groove of said lever arm may be displaced between said first and second positions,
   said engaging means-displacing means being connected to said lever arm to rotate said lever arm about its pivot so that said groove may be displaced in the direction parallel with the transfer path of the carrier.

3. An apparatus as set forth in claim 1, wherein each of said first and second vertically moveable support means includes two support members supporting thereon respective paired rails and each of said first and second drive means includes two drive members arranged so that said first and second front and rear rails may be vertically moved independently from each other by the actuation of respective drive members.

4. An apparatus as set forth in claim 1, wherein each of said first and second vertically moveable support means includes a common support member supporting thereon both of the paired rails so that the paired front rails are vertically moved together and the paired rear rails are also vertically moved together.

5. An apparatus as set forth in claim 1, comprising a conveyor chain having a connecting member adapted for engaging with the carrier so that the carrier engaged by said connecting member may be transferred along said transfer path by rotation of said conveyor chain.

6. An apparatus as set forth in claim 5, wherein said connecting member includes a C-shaped frame arranged for enclosing one of said wheel members of said carrier and for engagement therewith and oriented so that it may disengage from said wheel upon vertical movement of said carrier.

7. An apparatus as set forth in claim 1, further comprising a fluxer arranged in said transfer path and including a flux vessel forming a layer of flux thereover, and a pair of fluxer rails forming part of said transfer path and vertically moveable so that the printed circuit board carried on the carrier on said fluxer rails may vertically move to touch with the flux layer.

* * * * *